United States Patent [19]

Stevens et al.

[11] Patent Number: 4,523,058

[45] Date of Patent: Jun. 11, 1985

[54] RINGER SIGNAL WAVE SHAPING CIRCUIT

[75] Inventors: James C. Stevens, Plainfield; James R. Haynes, Indianapolis, both of Ind.

[73] Assignee: Uniden Corporation of America, Indianapolis, Ind.

[21] Appl. No.: 544,643

[22] Filed: Oct. 24, 1983

[51] Int. Cl.³ .............................................. H04M 1/00
[52] U.S. Cl. ................................. 179/84 T; 340/328; 340/329
[58] Field of Search ................ 179/84 T, 84 A, 84 R, 179/81 R; 381/72, 55; 340/384 E, 328, 329

[56] References Cited

U.S. PATENT DOCUMENTS

| | | | |
|---|---|---|---|
| 3,068,319 | 12/1962 | Fletcher et al. | 381/72 |
| 3,271,520 | 9/1966 | Fletcher et al. | 381/72 |
| 3,450,846 | 6/1969 | Why | 179/84 T |
| 3,466,403 | 9/1969 | Combridge et al. | 179/84 T |
| 4,010,329 | 3/1977 | Draper | 179/84 T |

Primary Examiner—Gene Z. Rubinson
Assistant Examiner—James L. Dwyer
Attorney, Agent, or Firm—Banner, Birch, McKie & Beckett

[57] ABSTRACT

Improved ringer signal circuitry in a telephone handset modifies the leading edge of the ringer signal envelope causing ringer volume to gradually increase, over a period of time, to its maximum value.

9 Claims, 9 Drawing Figures

RINGER SIGNAL WAVE SHAPING CIRCUIT

TECHNICAL FIELD

This invention relates to telephone handsets which incorporate ringer circuitry, and particularly, although not exclusively, to cordless telephone handsets.

BACKGROUND OF THE INVENTION

With the advent of one-piece and cordless telephones, the ringer signal, which alerts the recipient to the existence of an incoming call, and which was formerly produced in a base unit of the telephone has had to be produced in the telephone handset. For one-piece telephones, of course, the ringer signal must come from the handset because there is no base unit; for cordless telephones, the ringer signal must come from the handset because the base unit may be hundreds of feet away. In order to enable a person at some distance from the handset to hear the ringer, telephone manufacturers have amplified the ringer signal so that its volume is quite high. Although this poses no problem for persons who are far from the handset, it may be uncomfortable at very close range. Furthermore, if an incoming call arrives just as someone is lifting the handset to his or her ear to make an outgoing call, and if the hookswitch has not yet been moved from on-hook to off-hook (terms described below), the ringer signal volume at the ear could be excessive.

It is known that the human ear incorporates a physiological mechanism, at least for the inner ear, to protect it from loud sounds. This mechanism, which operates much like the automatic gain control (AGC) of a radio receiver, is a muscle which reduces the amount of sound that is allowed to proceed beyond the middle ear and which is controlled by nerves of the inner ear. However, the mechanism requires a short time, approximately 15 to 25 ms, before it can fully react, making it ineffective against sharp sounds such as gun shots, jackhammers, etc.

SUMMARY OF THE INVENTION

It is an object of the present invention to reduce the discomfort associated with a high ringer sound volume from a telephone handset.

Another object of the present invention is to reduce the probability that the ringer sound volume from a telephone handset will be excessive at the ear.

Another object of the present invention is to accomplish the foregoing objects while taking advantage of the natural physiological safety mechanism of the human ear.

These and other objects are achieved by shaping the leading edge of the ringer signal so that ringer sound volume rises gradually from zero to its maximum value. The long rise time provides two advantages. First, it allows anyone who is holding the handset near his or her ear ample time to pull the handset away to a comfortable distance. Second, it provides an opportunity for the natural AGC of the ear to protect it from the high volume.

BRIEF DESCRIPTION OF THE DRAWINGS

FIGS. 2A and B are diagrams illustrating the modification to the ringer signal which comes about as a result of the present invention.

DETAILED DESCRIPTION OF THE PREFERRED EMBODIMENT

Figure 1:
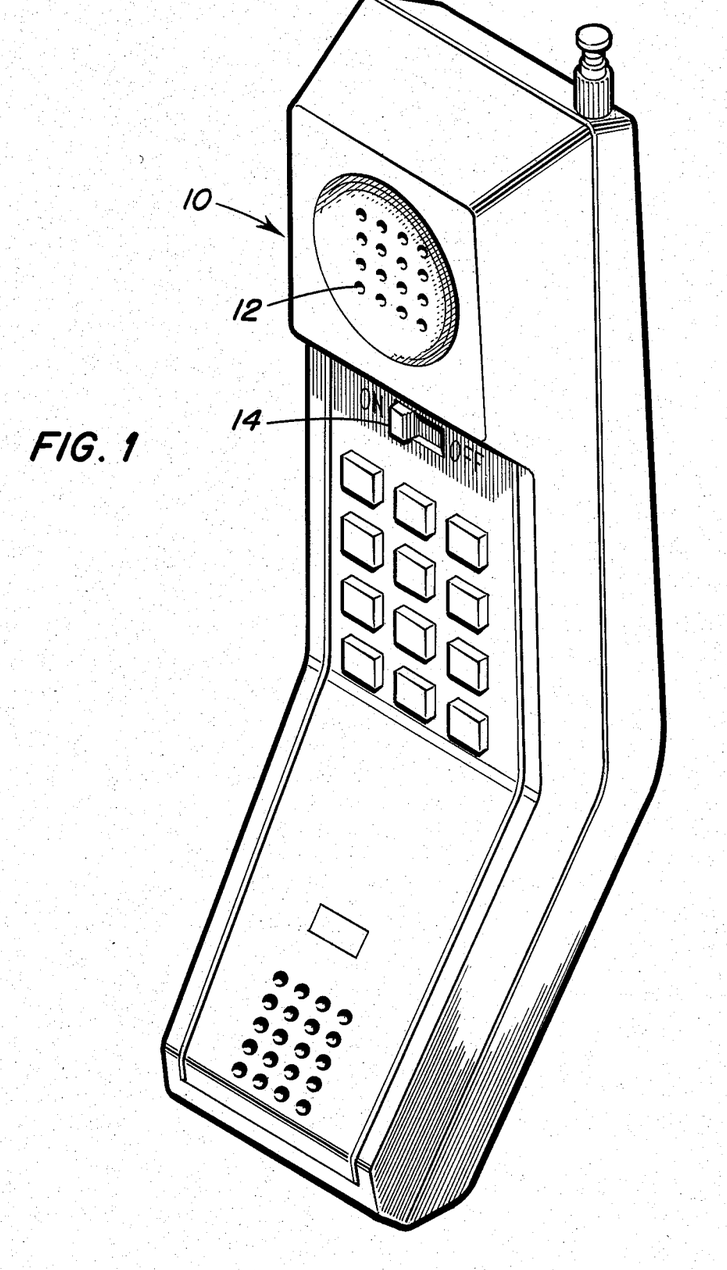
FIG. 1 is a perspective view of a telephone handset incorporating the present invention.
Figures 2A, 2B:
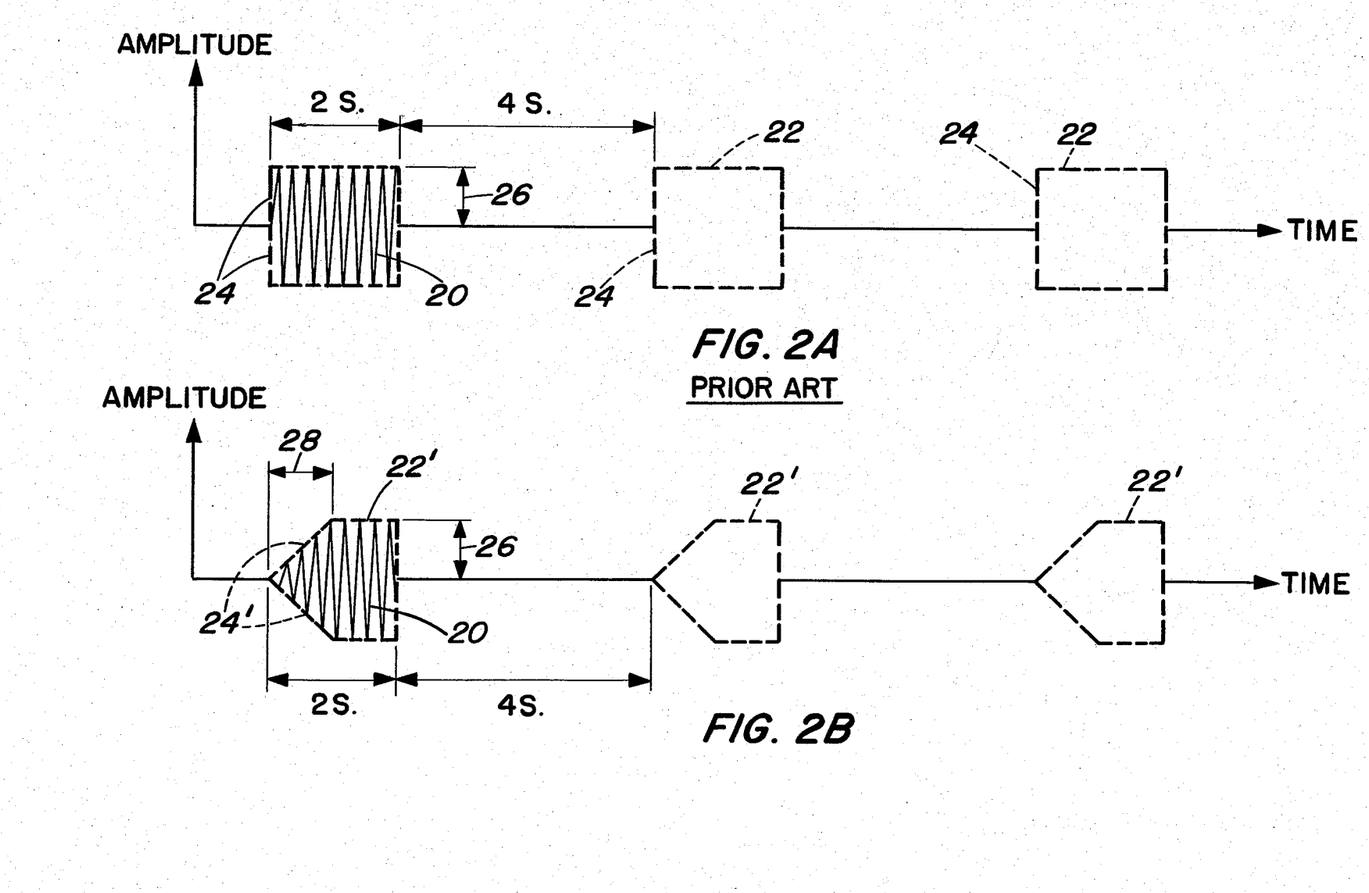

FIG. 1 shows a cordless telephone handset into which the present invention may be incorporated. Loudspeaker 12 performs a dual function: when the handset is in the off-hook condition, that is, when it is conditioned for two-way voice communication or for initiating an outgoing call, loudspeaker 12 converts the electrical signals arriving along the telephone lines into audible sounds. When the handset is in the on-hook condition, that is, when it is conditioned to receive an incoming call but not conditioned for two-way voice communication, loudspeaker 12 does not convert incoming electrical signals to audible sounds but instead responds to a locally generated ringer signal, producing the audible ringer sound which alerts the recipient to an incoming call. This latter function, production of a ringer sound when the handset is on-hook, may also be performed by a separate ringer sound source such as a piezoelectric element instead of the loundspeaker 12 through which voice signals are heard. Changing between on-hook and off-hook conditions is accomplished by means of hook switch 14. FIGS. 2A and 2B are amplitude-versus-time diagrams of ringer signals. A typical ringer signal is a 1 kHz audio frequency tone 20 on/off modulated by a rectangular modulating signal as shown in FIG. 2A. The envelope 22 of this wave has a nominally vertical leading edge 24. The duration of the "on" phase of this signal is approximately two seconds, with the "off" phase lasting approximately four seconds. This on and off modulation is repeated until the handset is placed in the off-hook condition by switching hook switch 14.

A telephone handset incorporating the present invention will produce a ringer signal such as that shown in FIG. 2B. The same audio frequency tone 20 is turned on and off at the same rate (approximately two seconds on and four seconds off); however, the leading edge 24' of the envelope 22' is no longer vertical but has a definite slope. This departure of leading edge 24' from the vertical means that the amplitude of the ringer signal, instead of rising almost instantaneously to its maximum amplitude, gradually increases over a period of time to that maximum amplitude. This can be seen by comparing FIGS. 2A and 2B. The maximum amplitude 26 of both ringer signals is the same. Since there is no reduction in the maximum sound level from loudspeaker 12, the recipient will still be alerted to an incoming call even if he or she is at some distance from the handset. However, although the maximum amplitude 26 of both ringer signals is the same, the ringer signal of FIG. 2B, that is, a ringer signal from a telephone handset incorporating the present invention, requires a definite period of time 28 to reach the maximum amplitude. In the preferred embodiment, this period of time 28 is approximately one second, which is well within the normal reaction time (one-half to three-quarters second) of a human being. Thus, a person holding the telephone handset is allowed adequate time to pull the loudspeaker away from his or her ear before the ringer signal reaches its maximum amplitude.

Figure 3:
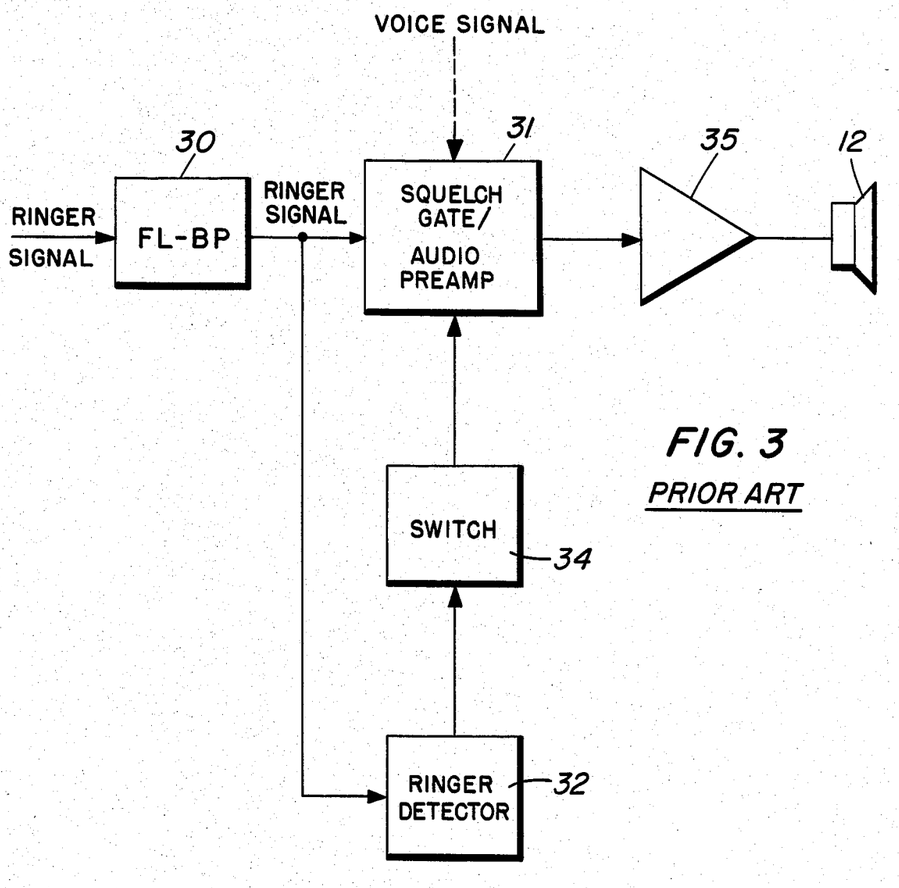
FIG. 3 is a block diagram of a typical arrangement in the prior art for producing a ringer sound.
Figure 4:
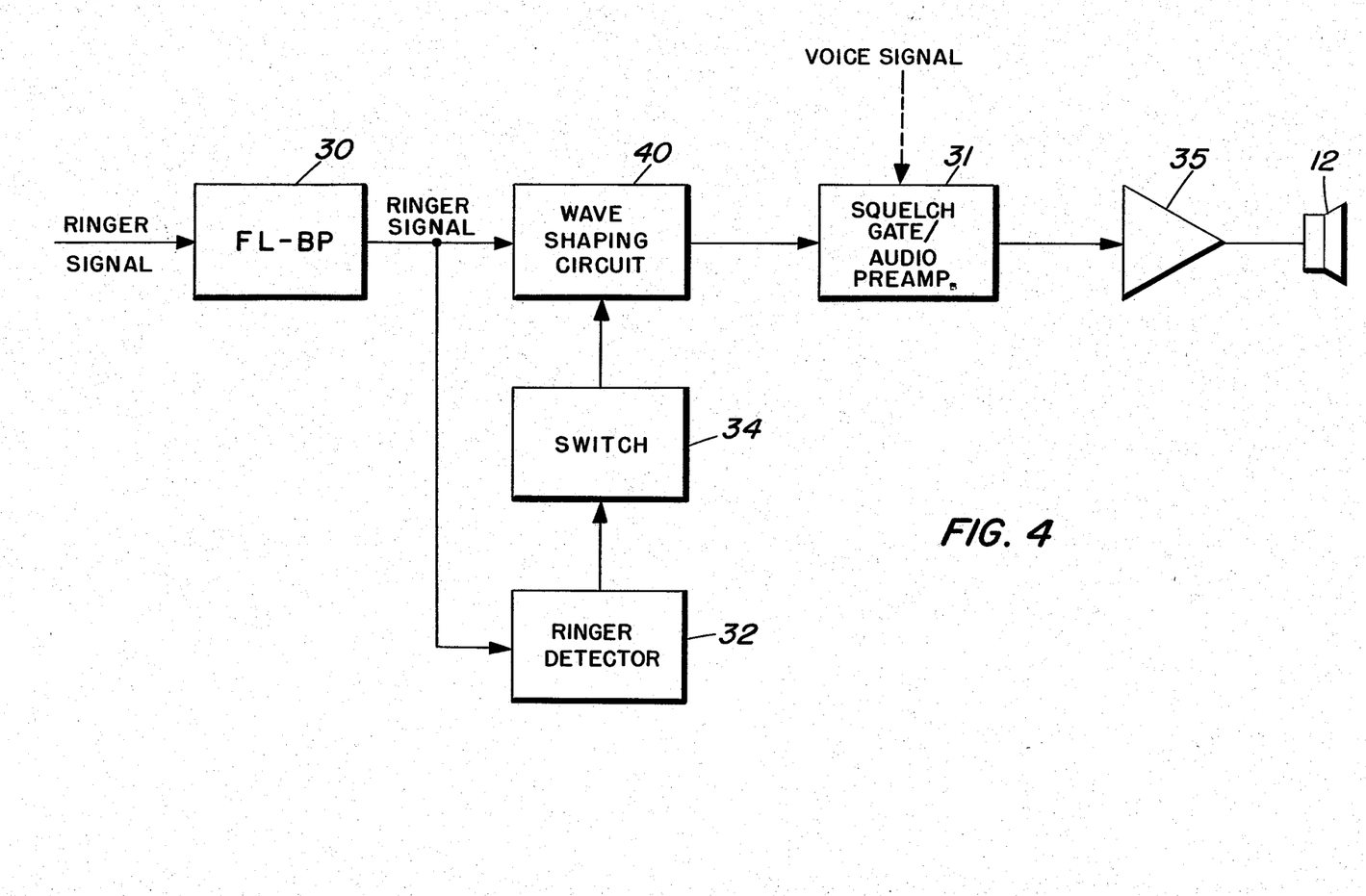
FIG. 4 is the block diagram of FIG. 3 modified in accordance with one embodiment of the present invention.

FIGS. 3 and 4 are block diagrams of the circuitry used to output a ringer signal in, respectively, prior art telephone handsets and telephone handsets incorporating the present invention. In the prior art, a ringer signal, either developed within the handset itself or transmitted from the base unit of a cordless telephone, is first passed through a band pass filter 30 and then delivered to both a squelch gate/audio preamplifier 31 and a ringer detector 32. If a signal of the proper frequency, for example 1 kHz, is detected by detector 32, it causes switch 34 to activate squelch gate/audio preamplifier 31, allowing the ringer signal to pass through to amplifier 35, an audio power amplifier for driving loudspeaker 12. These actions occur when the handset is in the on-hook condition. In the off-hook condition, a voice signal is passed to amplifier 35 by squelch gate 31, and the ringer signal is absent.

The circuitry employing the present invention appears in block diagram form in FIG. 4. A ringer signal, after passing through band pass filter 30, is delivered to ringer detector 32 and wave shaping circuit 40. If detector 32 detects a ringer signal of the proper frequency, it causes switch 34 to enable wave shaping circuit 40, which allows the ringer signal to pass through to squelch gate 31 and then to amplifier 35. In transmitting the ringer signal, wave shaping circuit 40 causes the leading edge of its envelope to depart from the vertical, preferably by introducing a phase delay. The modified ringer signal is amplified by squelch gate 31 and amplifier 35, and is converted to sound by loudspeaker 12, in the same manner as in the circuit of FIG. 3. In the off-hook condition, there is no ringer signal, and a voice signal passes through squelch gate 31, amplifier 35, and loudspeaker 12. It should be noted that ringer detector 32 and band pass filter 30 are conventional devices well within the ability of one skilled in this art to make and use.

Figure 5:
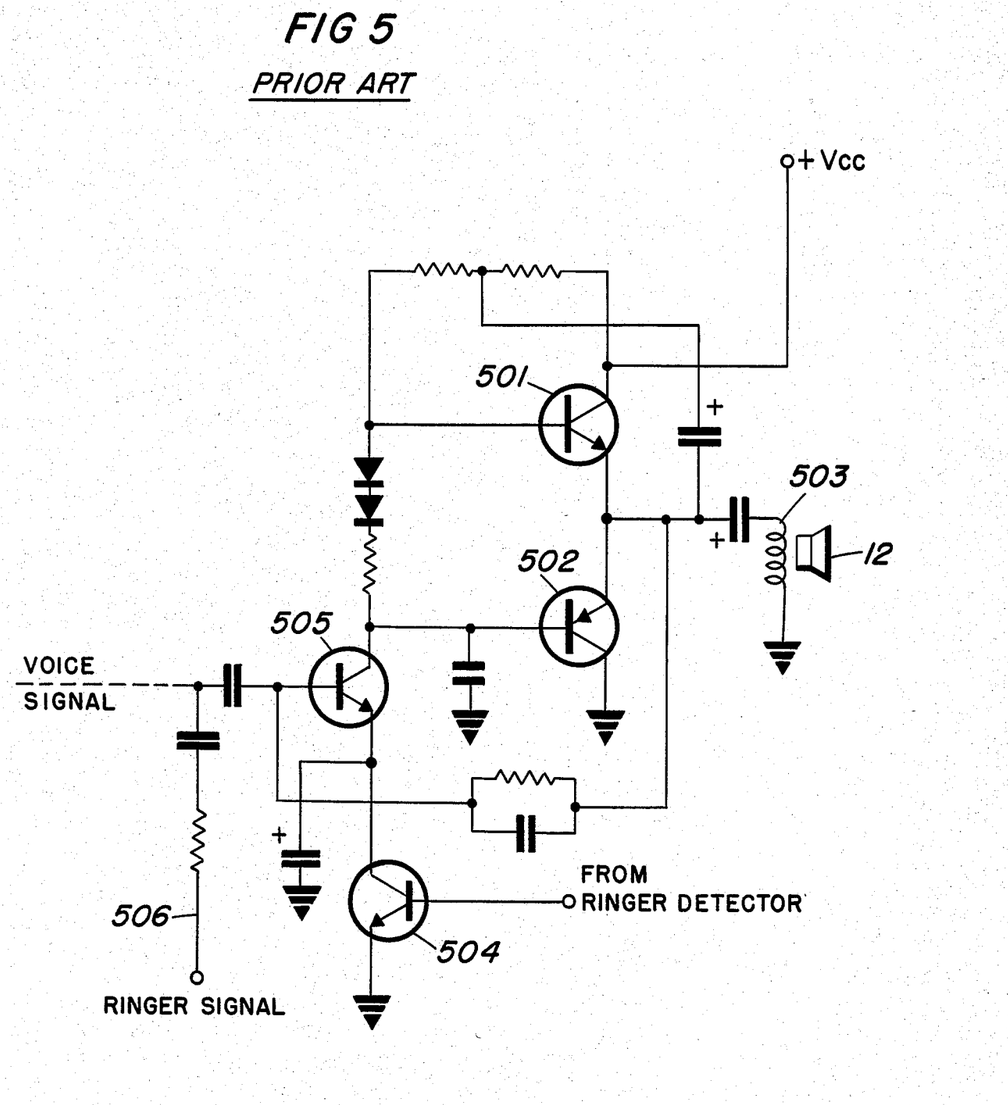
FIG. 5 is the schematic diagram corresponding to the block diagram of FIG. 3.
Figure 6:
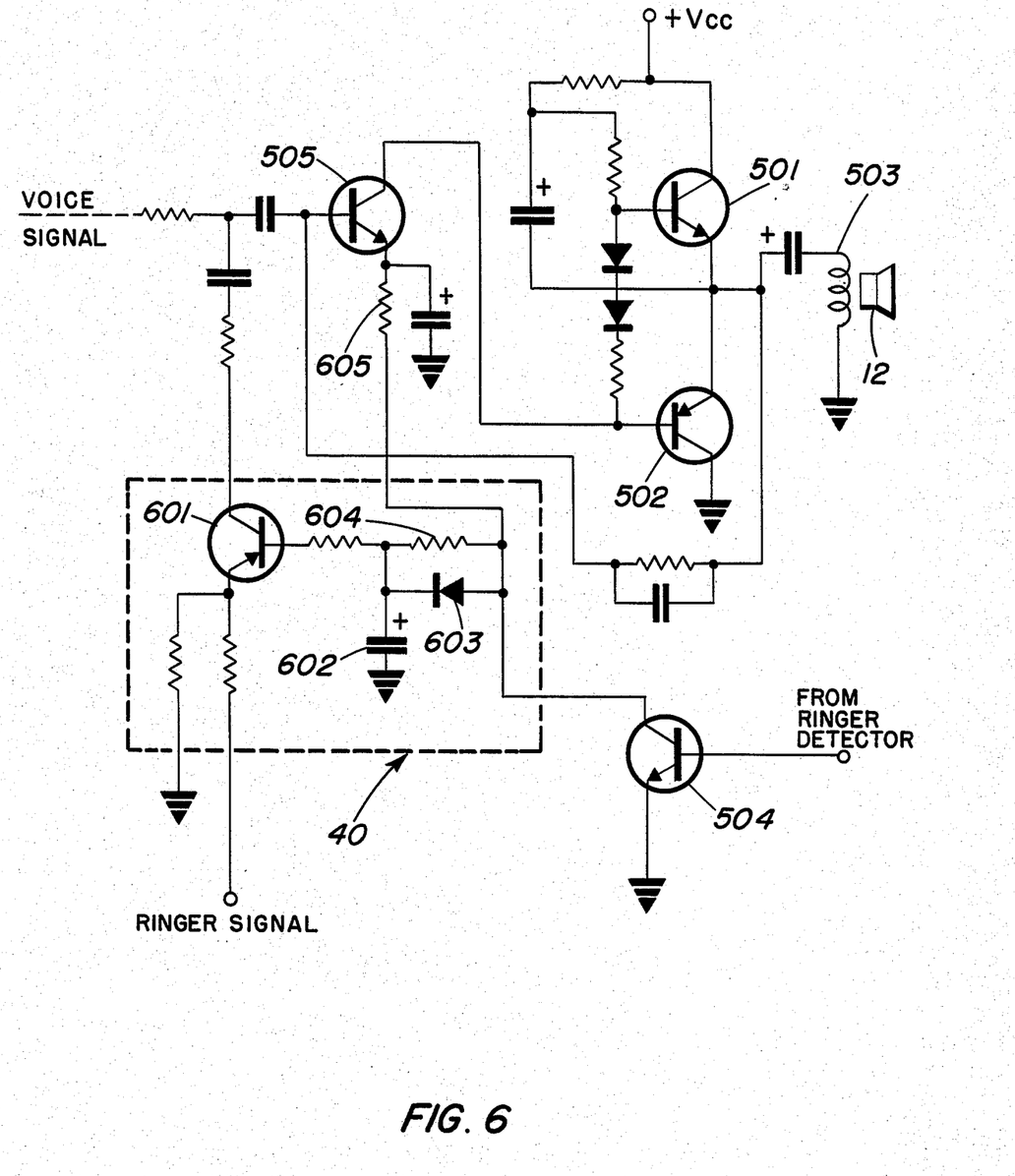
FIG. 6 is the schematic diagram corresponding to the block diagram of FIG. 4 illustrating one embodiment of the present invention within the dashed lines.

FIGS. 5 and 6 are schematic diagrams of the circuitry used to output a ringer signal in, respectively, prior art telephone handsets and telephone handsets incorporating the present invention. In FIG. 5, transistors 501 and 502 comprise a power amplifier which produces the driving voltage for coil 503 of loudspeaker 12. In the on-hook condition, with no ringer signal present, transistor 504 is held at cutoff by a low voltage applied to its base. This disables transistor 505 (which acts as the squelch gate), since the emitter of transistor 505 is floating. With transistor 505 disabled, the audio power amplifier comprising transistors 501 and 502 is also disabled since it has no input. Under these conditions, a ringer signal arriving on line 506 would not be heard from loudspeaker 12.

When the ringer detector detects that a ringer signal is present, it applies a positive voltage to the base of transistor 504, turning transistor 504 on (saturation), which grounds the emitter of transistor 505. This causes transistor 505 to apply an amplified ringer signal to the audio power amplifier, enabling the ringer signal to be heard from loudspeaker 12 at a high level. The time required to turn on transistor 504 is very short, making the ringer signal audible almost immediately upon its detection by the ringer detector.

An improved circuit incorporating the present invention is shown in FIG. 6, with the wave shaping circuit 40 enclosed in dashed lines for clarity. In the on-hook condition, with no ringer signal present, the circuit of FIG. 6 behaves exactly like that of FIG. 5.

When the ringer detector detects that a ringer signal is present, it applies a positive voltage to the base of transistor 504, turning transistor 504 on (saturation), which grounds the emitter of transistor 505. Under these conditions, the power amplifier will be able to amplify any signal applied to the base of transistor 505 (the input of the squelch gate).

No ringer signal will reach the base of transistor 505, however, as long as transistor 601 is cutoff. In the on-hook condition, with no ringer signal present, capacitor 602, which is tied to the floating emitter of transistor 505 by diode 603, remains charged, holding the base of transistor 601 at a positive voltage and maintaining the transistor at cutoff. When transistor 504 turns on, it grounds not only the emitter resistor of transistor 505 but also the anode of diode 603. This allows capacitor 602 to discharge through resistor 604. As capacitor 602 discharges, transistor 601 will begin conducting; transistor 601 will be fully on before capacitor 602 has discharged completely. Since the ringer signal is conducted through the emitter-collector path of transistor 601, the input signal to the base of transistor 505 will gradually increase over a period of time. This causes the ringer signal that is heard from loudspeaker 12 to increase from zero and gradually build to maximum volume. In the preferred embodiment, resistor 604 has a value of 0.1 megohm and capacitor 602 has a value of 10 uF, producing a time constant (RC) of one second. When capacitor 602 has discharged for one second, transistor 601 is fully on, and no further increase in ringer signal amplitude occurs although capacitor 602 continues to discharge.

The squelch gate/audio preamplifier circuitry was also slightly modified in devising the circuit of FIG. 6, by the addition of emitter resistor 605. Without this component, a residual ringer signal on the voice signal line would be amplified by transistor 505 even before transistor 601 allowed the principal ringer signal to pass through, since transistor 505 turns on almost instantaneously with transistor 504. In that case, the audible ringer sound from loudspeaker 12 would rise to its maximum from some positive value. To overcome this, resistor 605 was inserted into the emitter circuit of transistor 505. Resistor 605, which preferably has a value of less than 100 ohms, provides a slight delay after turn on of transistor 504 before transistor 505 turns on. (The delay is due to the discharge time of the emitter capacitor through resistor 605.) This allows transistor 601 to gradually turn on, and the audible ringer signal from loudspeaker 12 builds up gradually from zero.

Figure 7:
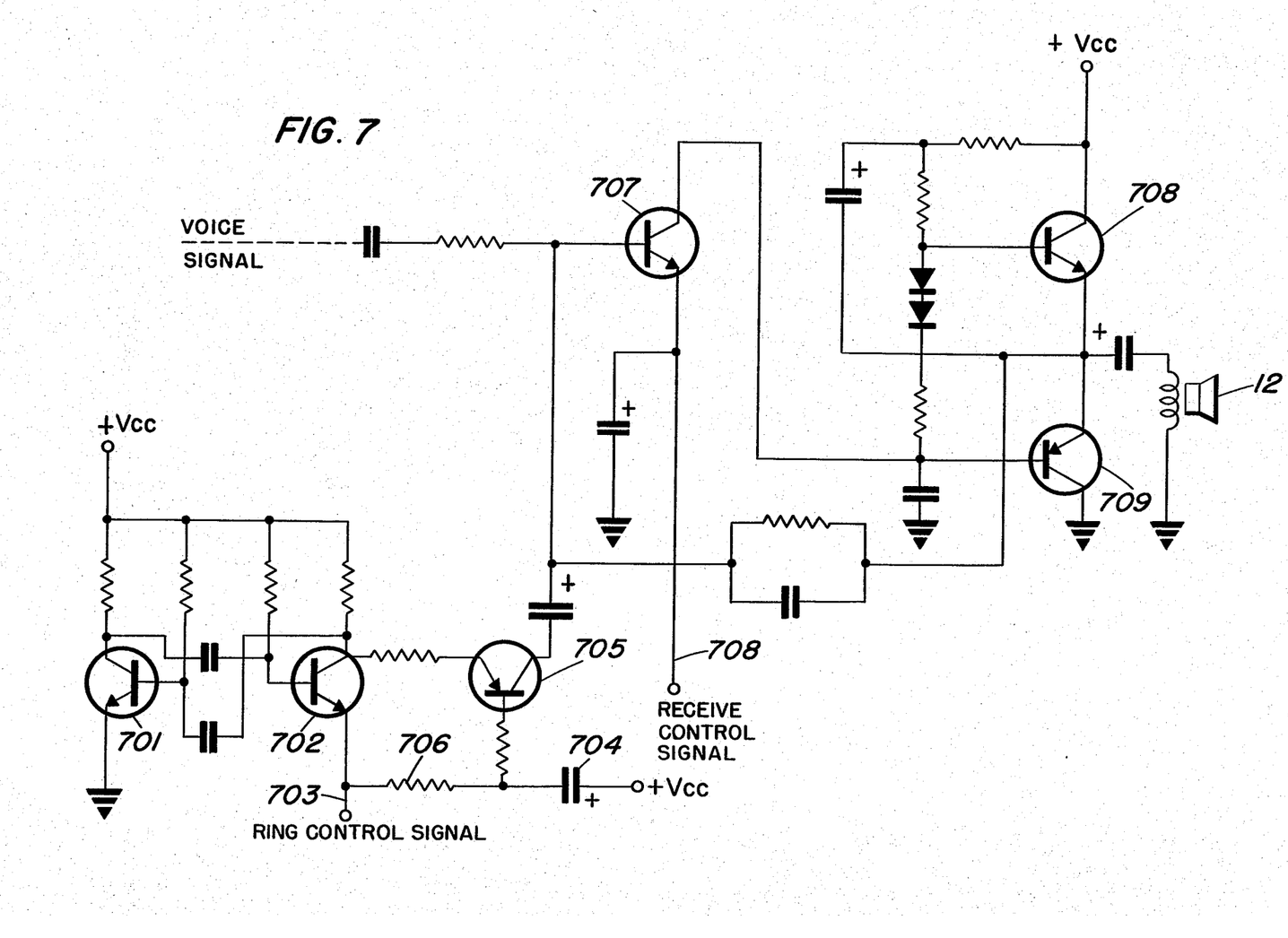
FIG. 7 is a schematic diagram illustrating another embodiment of the present invention.

FIG. 7 is a schematic diagram illustrating another embodiment of the present invention. In this case, the ringer signal is developed by a ringer oscillator contained within the handset and acting under control of a microprocessor. The ringer oscillator comprises transistors 701 and 702 which, along with their associated components, form an astable multivibrator. The multivibrator begins oscillating at the ringer signal frequency (for example 1 kHz) when line 703 is grounded by the microprocessor-generated ring control signal. Before line 703 is grounded, capacitor 704 holds no charge, and the base of transistor 705 is held at approximately the power supply voltage, causing transistor 705 to be cut-off. Upon the grounding of line 703, capacitor 704 begins to charge through resistor 706, gradually turning on transistor 705 and allowing the ringer signal developed by the multivibrator to pass through to transistor 707, the squelch gate. When a ringer control signal is generated by the microprocessor, or when voice communication is required, a receive control signal on line 708 grounds the emitter of transistor 707, enabling the transistor to operate. At any other time, line 708 is not grounded by a receive control signal, and transistor 707 is disabled. The gradual turning on of transistor 705 causes the input signal to the base of tansistor 708 to gradually increase over a period of time with the result that the ringer signal that is heard from loudspeaker 12 after amplification by the audio power amplifier (transistors 708 and 709) increases from zero and gradually builds to maximum volume.

Figure 8:
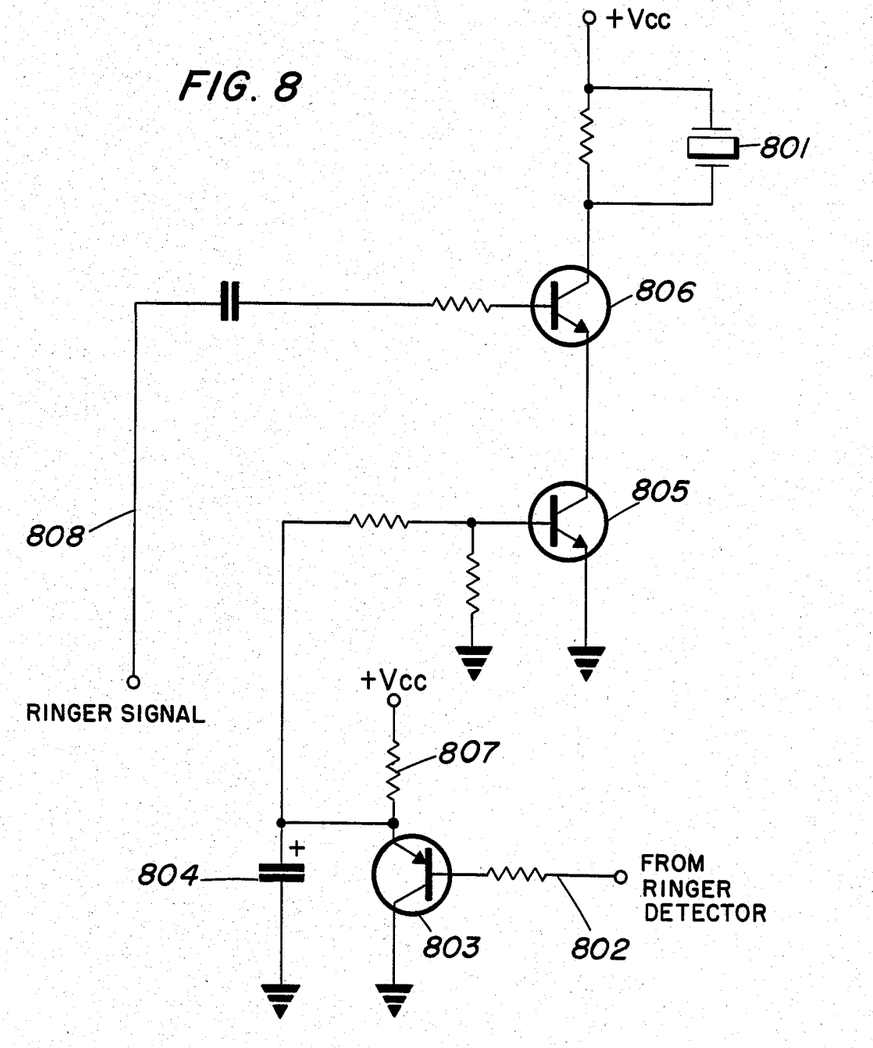
FIG. 8 is a schematic diagram illustrating another embodiment employing a piezoelectric element rather than a loudspeaker as the audio output device.

FIG. 8 illustrates another embodiment of the invention, in this case using a piezoelectric ringer element 801 rather than a loudspeaker to produce the audible ringer sound. In the on-hook condition with no ringer signal present, line 802 from the ringer detector is held at a negative potential, causing transistor 803 to conduct and maintaining capacitor 804 in a discharge state. With capacitor 804 discharged, transistor 805 is cutoff, and transistor 806, the ringer amplifier, is disabled. When the ringer detector detects the proper ringer signal it supplies a positive voltage on line 802 to the base of transistor 803, cutting off the transistor. Capacitor 804 then gradually charges through resistor 807, gradually turning on transistor 805 and gradually enabling amplifier transistor 806. The ringer signal, arriving on line 808, is amplified by transistor 806 and converted to sound by piezoelectric element 801. The gradual enablement of transistor 806 causes the ringer signal heard from piezoelectric element 801 to increase from zero and gradually build to maximum volume.

We claim:

1. In a telephone handset having audio output means to which an audio frequency ringer signal is periodically applied when the handset is in an on-hook condition, an improvement comprising a wave shaping circuit to initially block each ringer signal, and then gradually increase the amplitude of each ringer signal to substantially the level it would have had without said wave shaping circuit during a period of time not greater than the duration of each ringer signal.

2. The telephone handset of claim 1 wherein said audio output means comprises a loudspeaker.

3. The telephone handset of claim 2 wherein, when the handset is in an off-hook condition, a voice signal is applied to said loudspeaker.

4. The telephone handset of claim 1 wherein said audio output means is a piezoelectric element.

5. The telephone handset of claim 1 wherein the period of time during which the gradual increase occurs is greater than or equal to the normal reaction time of a human being.

6. An improved telephone handset having, as old elements, means for periodically receiving a ringer signal and audio output means for converting the ringer signals to sound, each of said ringer signals having an envelope with a nominally vertical leading edge, the improvement comprising wave shaping means for causing the leading edges of the envelopes to depart from vertical.

7. The improved telephone handset of claim 6 wherein said wave shaping means includes means for introducing a phase delay into the leading edge.

8. An improved telephone handset having, as old elements, means for periodically receiving a ringer signal, detecting means responsive to each ringer signal for producing an enabling signal, amplifier means responsive to the enabling signals for amplifying the ringer signals, and audio output means for converting the amplified ringer signals to sound, each of said ringer signals having an envelope with a nominally vertical leading edge, the improvement comprising a wave shaping circuit responsive to the enabling signals to cause the leading edges of the envelopes to depart from vertical.

9. An improved telephone handset having, as old elements, means for periodically receiving a ringer control signal, oscillator means responsive to each ringer control signal for generating a ringer signal having an envelope with a nominally vertical leading edge, amplifier means for amplifying each ringer signal, and audio output means for converting the amplified ringer signals to sound, the improvement comprising a wave shaping circuit to cause the leading edges of the envelopes to depart from vertical.

* * * * *